US008189460B2

(12) United States Patent
Shaffer et al.

(10) Patent No.: US 8,189,460 B2
(45) Date of Patent: May 29, 2012

(54) METHOD AND SYSTEM FOR PROVIDING CONGESTION MANAGEMENT WITHIN A VIRTUAL TALK GROUP

(75) Inventors: Shmuel Shaffer, Palo Alto, CA (US); Kittur V. Nagesh, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 462 days.

(21) Appl. No.: 11/617,019

(22) Filed: Dec. 28, 2006

(65) Prior Publication Data
US 2008/0159128 A1 Jul. 3, 2008

(51) Int. Cl.
*H04L 12/50* (2006.01)
(52) U.S. Cl. .......... 370/229; 455/39; 455/500; 455/507; 455/518; 709/227; 709/229
(58) Field of Classification Search .................. 370/229; 455/39, 500, 507, 517, 518; 709/227, 229
See application file for complete search history.

(56) References Cited

U.S. PATENT DOCUMENTS

| | | | |
|---|---|---|---|
| 4,359,603 A | 11/1982 | Heaton | 370/267 |
| 4,730,306 A | 3/1988 | Uchida | 370/263 |
| 5,014,345 A * | 5/1991 | Comroe et al. | 455/519 |
| 5,048,082 A | 9/1991 | Krafft et al. | 379/406.07 |
| 5,099,510 A | 3/1992 | Blinken et al. | 379/202.01 |
| 5,274,782 A * | 12/1993 | Chalasani et al. | 710/317 |
| 5,436,896 A | 7/1995 | Anderson et al. | 370/260 |
| 5,539,741 A | 7/1996 | Barraclough et al. | 370/267 |
| 5,625,407 A | 4/1997 | Biggs et al. | 348/14.11 |
| 6,011,851 A | 1/2000 | O'Connor et al. | 381/17 |
| 6,094,578 A | 7/2000 | Purcell et al. | 455/426 |
| 6,178,237 B1 | 1/2001 | Horn | 379/202.01 |
| 6,185,205 B1 | 2/2001 | Sharrit et al. | 370/389 |
| 6,233,315 B1 | 5/2001 | Reformato et al. | 379/88.01 |
| 6,327,567 B1 | 12/2001 | Willehadson et al. | 704/270 |
| 6,374,100 B1 | 4/2002 | Smith et al. | 455/419 |
| 6,400,816 B1 | 6/2002 | Hjalmtysson et al. | 379/201.03 |
| 6,404,873 B1 | 6/2002 | Beyda et al. | 379/202.01 |

(Continued)

FOREIGN PATENT DOCUMENTS

EP   1519594 A2 *  3/2005

(Continued)

OTHER PUBLICATIONS $V^{IP}$ Dispatch Console, OpenSky, NetworkFirst, $P25^{IP}$, Data Sheet, M/A-COM, Inc. ECR-7241B, http://www.opensky.com/network/7241B.pdf, 2 pages, Oct. 2004.

(Continued)

*Primary Examiner* — Hassan Kizou
*Assistant Examiner* — Siming Liu
(74) *Attorney, Agent, or Firm* — Baker Botts L.L.P.

(57) ABSTRACT

A method for providing congestion management within a virtual talk group includes facilitating communication within a virtual talk group between a plurality of endpoints of different communication networks. The method also includes monitoring a communication congestion level within the virtual talk group and tracking at least one priority characteristic for at least one endpoint of the plurality of endpoints within the virtual talk group. The method further includes detecting that the communication congestion level exceeds a congestion threshold and reducing the congestion level by executing at least one policy based on the at least one priority characteristic of the at least one endpoint.

44 Claims, 3 Drawing Sheets

U.S. PATENT DOCUMENTS

| | | | |
|---|---|---|---|
| 6,408,327 B1 | 6/2002 | McClennon et al. | 709/204 |
| 6,418,214 B1 | 7/2002 | Smythe et al. | 379/202.01 |
| 6,453,022 B1 | 9/2002 | Weinman, Jr. | 379/88.13 |
| 6,501,739 B1 | 12/2002 | Cohen | 370/260 |
| 6,608,820 B1 | 8/2003 | Bradshaw, Jr. | 370/260 |
| 6,792,092 B1 | 9/2004 | Michalewicz | 379/202 |
| 6,810,259 B1 | 10/2004 | Zhang | 455/456.5 |
| 6,850,496 B1 | 2/2005 | Knappe et al. | 370/260 |
| 6,873,854 B2 | 3/2005 | Crockett et al. | 455/518 |
| 6,882,856 B1 | 4/2005 | Alterman et al. | 455/519 |
| 6,885,874 B2 | 4/2005 | Grube et al. | 455/520 |
| 6,912,389 B2 | 6/2005 | Bright et al. | 455/433 |
| 6,982,961 B2 | 1/2006 | Refai et al. | 370/265 |
| 6,987,480 B1 | 1/2006 | Kotick et al. | 342/41 |
| 6,987,841 B1 | 1/2006 | Byers et al. | 379/88.17 |
| 6,993,120 B2 | 1/2006 | Brown et al. | 379/88.13 |
| 6,996,406 B2 | 2/2006 | Lection et al. | 455/457 |
| 6,999,782 B2 | 2/2006 | Shaughnessy et al. | 455/518 |
| 6,999,783 B2 | 2/2006 | Toyryla et al. | 455/519 |
| 7,003,286 B2 | 2/2006 | Brown et al. | 455/416 |
| 7,006,607 B2 | 2/2006 | Garcia | 379/88.18 |
| 7,010,106 B2 | 3/2006 | Gritzer et al. | 379/202.01 |
| 7,010,109 B2 | 3/2006 | Gritzer et al. | 379/202.01 |
| 7,010,275 B2 | 3/2006 | Davies | 455/90.2 |
| 7,013,279 B1 | 3/2006 | Nelson | 704/270 |
| 7,031,700 B1 | 4/2006 | Weaver et al. | 455/420 |
| 7,035,385 B2 | 4/2006 | Levine et al. | 379/88.23 |
| 7,058,168 B1 | 6/2006 | Knappe et al. | 379/204.01 |
| 7,079,857 B2 | 7/2006 | Maggenti et al. | 455/518 |
| 7,218,663 B1 | 5/2007 | Yokota et al. | |
| 7,328,243 B2 | 2/2008 | Yeager et al. | 709/205 |
| 7,505,755 B2 * | 3/2009 | Taniguchi et al. | 455/405 |
| 2001/0028321 A1 | 10/2001 | Krasner | 342/357.1 |
| 2002/0013813 A1 | 1/2002 | Matsuoka | 709/204 |
| 2002/0152305 A1 | 10/2002 | Jackson et al. | 709/224 |
| 2002/0178364 A1 | 11/2002 | Weiss | 713/182 |
| 2003/0100326 A1 | 5/2003 | Grube et al. | 455/515 |
| 2003/0119540 A1 * | 6/2003 | Mathis | 455/518 |
| 2004/0054428 A1 | 3/2004 | Sheha et al. | 700/56 |
| 2004/0070515 A1 * | 4/2004 | Burkley et al. | 340/825.49 |
| 2004/0139320 A1 | 7/2004 | Shinohara | 713/168 |
| 2004/0185863 A1 | 9/2004 | Ogami | 455/452.1 |
| 2004/0192353 A1 | 9/2004 | Mason et al. | 455/457 |
| 2004/0249949 A1 | 12/2004 | Gourraud et al. | 709/227 |
| 2005/0135348 A1 | 6/2005 | Staack | 370/353 |
| 2005/0170844 A1 * | 8/2005 | Barclay et al. | 455/456.1 |
| 2005/0174991 A1 | 8/2005 | Keagy | 370/352 |
| 2005/0232207 A1 | 10/2005 | Antoniadis et al. | 370/338 |
| 2005/0265256 A1 | 12/2005 | Delaney | 370/254 |
| 2006/0035657 A1 | 2/2006 | Lim | 455/518 |
| 2006/0063551 A1 | 3/2006 | Martin et al. | |
| 2006/0114847 A1 | 6/2006 | Dssouli et al. | 370/261 |
| 2006/0118636 A1 | 6/2006 | Miles et al. | 235/472 |
| 2006/0165060 A1 | 7/2006 | Dua | 370/352 |
| 2006/0209871 A1 | 9/2006 | Blasco Claret et al. | 370/437 |
| 2006/0211426 A1 | 9/2006 | Costa et al. | |
| 2006/0294243 A1 * | 12/2006 | Kuure et al. | 709/227 |
| 2007/0030144 A1 | 2/2007 | Titus et al. | 340/534 |
| 2007/0049314 A1 | 3/2007 | Balachandran et al. | 455/518 |
| 2007/0060144 A1 | 3/2007 | Mills et al. | 455/445 |
| 2007/0115848 A1 | 5/2007 | Chean et al. | 370/252 |
| 2007/0184814 A1 | 8/2007 | Hamilton | 455/404.1 |
| 2007/0202907 A1 * | 8/2007 | Shaffer et al. | 455/518 |
| 2007/0233802 A1 | 10/2007 | Kulkarni | 709/207 |
| 2007/0239824 A1 | 10/2007 | Shaffer et al. | 709/204 |
| 2008/0037461 A1 | 2/2008 | Biltz et al. | 370/328 |
| 2008/0167049 A1 | 7/2008 | Karr et al. | 455/456 |
| 2009/0040021 A1 | 2/2009 | Seo et al. | 340/10.1 |

FOREIGN PATENT DOCUMENTS

| | | |
|---|---|---|
| EP | 1622408 A1 * | 2/2006 |
| WO | WO 02/074051 | 9/2002 |

OTHER PUBLICATIONS

Cisco IP Interoperability and Collaboration System, Q&A, Copyright © Cisco Systems, Inc. www.cisco.com, 4 pages, Oct. 2005.

Cisco IPICS, Solution Overview, Copyright © Cisco Systems, Inc., www.cisco.com/go/ipics, 6 pages, Oct. 2005.

MRT Urgent Communications: Service, Safety, Security, M/A-COM Emphasizes Power of IP in Seven Announcements at APCO, Aug. 18, 2002, 6 pages. http://mrtmag.com/products/new/radio_macom emphasizes_power, Aug. 18, 2002.

Jim McKay, *Government Technology*, "Intact Amid Chaos", Mar. 2005, 2 pages, Mar. 2005.

Ian Hoffman, *Oakland Tribune*, "Oakland's New Radios Pass Test, City, Regional Agencies Get Green Light to Buy Public-Safety Equipment," 2007, 2 pages (reprinted by Tyco Electronics and available at http://www.macom-wireless.com/news/oaklands%20new%20radios.asp), Mar. 11, 2005.

MRT Urgent Communications: Service, Safety, Security, "5 for '05 Technologies," Dec. 1, 2004, 9 pages. http://mrtmag.com/mag/radio_technologies, Dec. 1, 2004.

MRT Urgent Communications: Service, Safety, Security, John Facella, "ROIP Success is in the Details," Dec. 1, 2004, 3 pages. http://mrtmag.com/mag/radio_roip_success_details/.

Ann Imse, *Rocky Mountain News*, "Radio Breakthrough for Cops, Firefighters," Dec. 10, 2004, 2 pgs.

*First Responder Communications*, A Supplement to MRT and Fire Chief, "IP Opens Eyes," Aug. 2004, 5 pages.

*MRT, Mobile Radio Technology*, "IP Evangelist," Apr. 2004, 4 pages, www.iwce-mrt.com.

Ron Bender, et al., *MRT; Mobile Radio Technology* "Multiple Choices for Critical Communications," Oct. 2001, 4 pages, www.mrtmag.com.

Jay Herther, et al., *MRT; Mobile Radio Technology*, "Voice-over-Interintranet Protocol for Critical Communications," Aug. 2001, 4 pages, www.mrtmag.com.

*What's New in Radio Communications*, Aug./Sep. 2001, vol. 14 No. 1, Inside: Marine Radio, 2 pages, www.westwick-farrow.com.au.

Shaffer et al., U.S. Appl. No. 11/364,146, filed Feb. 27, 2006, Communication from the U.S. Patent and Trademark Office mailed Oct. 14, 2008.

Shaffer et al., U.S. Appl. No. 11/364,146, filed Feb. 27, 2006, Communication from the U.S. Patent and Trademark Office mailed Mar. 26, 2009.

Shaffer et al., U.S. Appl. No. 11/399,031, filed Apr. 5, 2006, Communication from the U.S. Patent and Trademark Office mailed Dec. 5, 2008.

Rivero-Angeles, Mario et al., *Random-Access Control Mechanism Using Adaptive Traffic Load in ALOHA and CSMA Strategies for EDGE*, May 2005, IEEE Transactions on Vehicular Technology, vol. 54, No. 3, 2 (1161) May 2005.

PCT International Search Report and Written Opinion (ISA/US) for PCT/US06/19227; 7 pages, Sep. 4, 2007.

Shaffer et al., U.S. Appl. No. 11/399,031, filed Apr. 5, 2006, Communication from the U.S. Patent and Trademark Office mailed Jun. 24, 2009.

Shaffer et al., U.S. Appl. No. 11/364,146, filed Jan. 27, 2006, Communication from the U.S. Patent and Trademark Office mailed Oct. 28, 2009.

Shaffer et al., U.S. Appl. No. 11/399,031, filed Apr. 5, 2006, Communication from the U.S. Patent and Trademark Office mailed Dec. 28, 2009.

Shaffer et al., U.S. Appl. No. 11/364,146, Office Action from the U.S. Patent and Trademark Office dated Mar. 11, 2010.

Shaffer et al., U.S. Appl. No. 11/364,146, Final Office Action from the U.S. Patent and Trademark Office dated Sep. 1, 2010.

Communication from The Patent Office of the People's Republic of China, The Second Office Action regarding Appln. 200780011091.7, Date of issue Nov. 25, 2010.

Shaffer et al., U.S. Appl. No. 11/364,146, "Method and System for Providing Interoperable Communication with Congestion Management," Office Action from the U.S. Patent and Trademark Office dated Mar. 15, 2011.

Shaffer et al., U.S. Appl. No. 11/399,031, "Method and System for Managing Virtual Talk Group," Office Action from the U.S. Patent and Trademark Office dated Feb. 18, 2011.

NetworkFirst Interoperability Solved, Data Sheet, M/A-COM, Inc., ECR-7018A, http://www.networkfirst.com/resources/pdf/NetworkFirstRevised5_03.pdf, 6 pages, May 2003.

Network Solution:, Information Sheet, NetworkFirst, M/A-COM, Inc., http://www.networkfirst.com/features/solution, 2 pages, 2003.

It's Our Network That Makes the Difference, Information Sheet, OpenSky Network, M/A-COM, Inc., http://www.opensky.com/network/index.asp, 2 pages, Feb. 2004.

Network Management, Information Sheet, OpenSky Network, M/A-COM, Inc., http://www.opensky.com/network/netmgmtsys.asp, 2 pages, Oct. 2004.

ACU-1000™ Interoperability NOW™, Information Sheet, Raytheon JPS Communications, http://www.jps.com/downloads/PDFS/acuupgrade.pdf, 4 pages, Mar. 2004.

Interoperability Gateway, OpenSky, NetworkFirst, P25$^{IP}$, Data Sheet, M/A-COM, Inc. ECR-7054, http://www.opensky.com/network/7054.pdf, 2 pages, May 2003.

C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages, Oct. 2003.

V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages, Oct. 2004.

J. Polk, et al., Dynamic Host Configuration Protocol Option for Coordinate-based Location Configuration Information, Network Working Group, Internet RFC 3825, Category: Standards Track, The Internet Society, 15 pages, Jul. 2004.

OnStar Technology, Information Sheet, OnStar Corp., http://www.onstar.com/us_english/jsp/explore/onstar_basics/technology.jsp, 3 pages, 2005

Cisco IP Interoperability and Collaboration System, Q&A, Copyright © Cisco Systems, Inc. www.cisco.com, 4 pages, printed Mar. 2006.

Cisco IPICS, Solution Overview, Copyright © Cisco Systems, Inc., www.cisco.com/go/ipics, 6 pages, printed Mar. 2006.

Matthews, et al., *A New Interoperability Paradigm A Concept Proposal*, Mar. 2006, *Worcester Polytechnic Institute, WPI Bioengineering Institute* (Mar. 2006), 15 pages.

Shaffer, et al., U.S. Appl. No. 11/149,041, filed Jun. 8, 2005, *Method and System for Communicating Using Position Information*, Jun. 8, 2005.

Shaffer, et al., U.S. Appl. No. 11/201,832, filed Aug. 10, 2005, *Method and System for Automatic Configuration of Virtual Talk Groups Based on Location of Media Source*, Aug. 10, 2005.

Shaffer, et al., U.S. Appl. No. 11/202,400, filed Aug. 10, 2005, *Method and System for Communicating Media Based on Location of Media Source*, Aug. 10, 2005.

Shaffer, et al., U.S. Appl. No. 11/202,403, filed Aug. 10, 2005, *Method and System for Providing Interoperable Communications with Location Information*, Aug. 10, 2005.

Shaffer, et al., U.S. Appl. No. 11/214,582, filed Aug. 29, 2005, *Method and System for Conveying Source Location Information*, Aug. 29, 2005.

Shaffer, et al., U.S. Appl. No. 11/364,146, filed Feb. 27, 2006, *Method and System for Providing Interoperable Communication with Congestion Management*, Feb. 27, 2006.

Shaffer, et al., U.S. Appl. No. 11/365,113, filed Feb. 28, 2006, *Method and System for Providing Interoperable Communication with Dynamic Event Area Allocation*, Feb. 28, 2006.

Shaffer, et al., U.S. Appl. No. 11/399,031, filed Apr. 5, 2006, *Method and System for Managing Virtual Talk Groups*, Apr. 5, 2006.

Shaffer, et al., U.S. Appl. No. 11/382,496, filed May 10, 2006, *Providing Multiple Virtual Talk Group Communication Sessions*, Mar. 10, 2006.

Kalley, et al., U.S. Appl. No. 11/383,998, filed May 18, 2006, *Providing Virtual Talk Group Communication Sessions in Accordance with Endpoint Resources*, May 18, 2006.

Shaffer, et al., U.S. Appl. No. 11/421,994, filed Jun. 2, 2006, *Method and System for Joining a Virtual Talk Group*, Jun. 2, 2006.

Shaffer, et al., U.S. Appl. No. 11/421,999, filed Jun. 2, 2006, *Method and System for Managing a Plurality of Virtual Talk Groups*, Jun. 2, 2006.

Shaffer, et al., U.S. Appl. No. 11/746,960, filed May 10, 2007, *Method and System for Handling Dynamic Incidents*, May 10, 2007.

Shaffer, et al., U.S. Appl. No. 11/550,234, filed Oct. 17, 2006, *Method and System for Providing an Indication of a Communication*, Oct. 17, 2006.

PCT Notification of Transmittal of the International Search Report and the Written Opinion of the International Searching Authority, or the Declaration, mailed Feb. 27, 2007, corresponding to PCT/US06/30447 filed Aug. 3, 2006 (20 pages).

PCT Notification of Transmittal of the International Search Report and the Written Opinion of the International Searching Authority, or the Declaration, mailed Apr. 9, 2007, corresponding to PCT/US06/30294 filed Aug. 2, 2006 (20 pages).

* cited by examiner

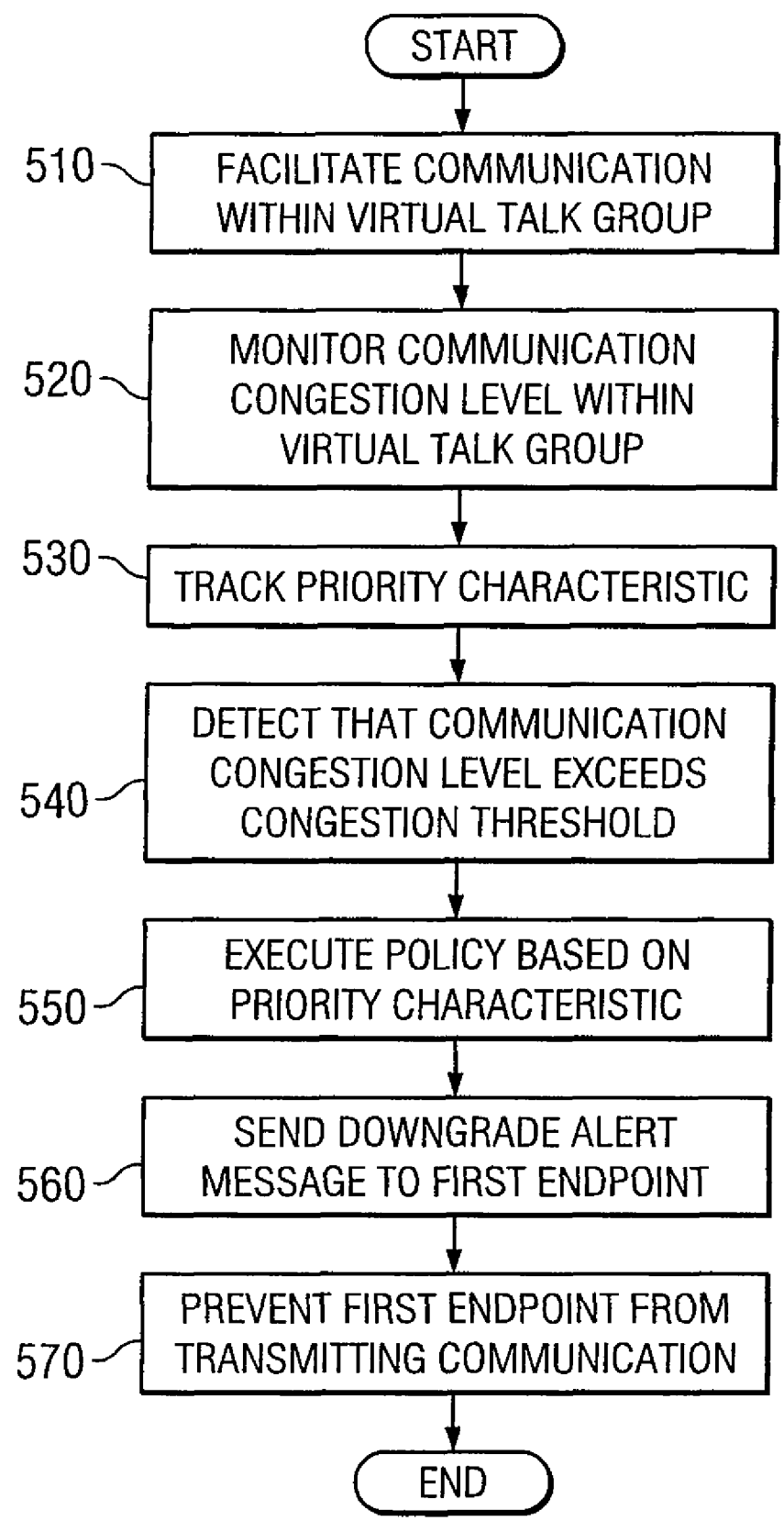

METHOD AND SYSTEM FOR PROVIDING CONGESTION MANAGEMENT WITHIN A VIRTUAL TALK GROUP

TECHNICAL FIELD OF THE INVENTION

This invention relates in general to communication systems and, more particularly, to a method and system for providing congestion management within a virtual talk group.

BACKGROUND OF THE INVENTION

Many public and private groups, such as security and safety personnel (e.g., police, fire fighters and ambulance drivers) use various communication networks of differing technologies and types for communication. Many networks utilize land mobile radios communicating through push-to-talk technologies. However, communications among different endpoints of different networks such as endpoints of different police, fire or other security networks may be difficult. Collaboration between the different agencies and networks tends to be ad hoc and inefficient. When achieved, it often involves laborious manual intervention. Organizations working towards interoperability solutions include Raytheon JPS Communications, IP Blue, Twisted Pair, M/A-COM and Cisco Systems.

Some interoperability solutions encounter problems, such as problems with congestion. If, for example, several different agencies were to all have users communicating with one another, such as in a large emergency situation, the communications may become lost or garbled due to congestion. Certain protocols, such as multi-level preemption protocol (MLPP), provide a means for higher priority users to preempt lower priority users. However, this often causes the interruption of lower priority users. Furthermore, if the radio lacks the ability make the user and/or device visible it is not possible to implement MLPP.

SUMMARY OF THE INVENTION

Particular embodiments provide a method and system for providing congestion management within a virtual talk group that substantially eliminates or reduces at least some of the disadvantages and problems associated with previous methods and systems.

In accordance with a particular embodiment, a method for providing congestion management within a virtual talk group includes facilitating communication within a virtual talk group between a plurality of endpoints of different communication networks. The method also includes monitoring a communication congestion level within the virtual talk group and tracking at least one priority characteristic for at least one endpoint of the plurality of endpoints within the virtual talk group. The method further includes detecting that the communication congestion level exceeds a congestion threshold and reducing the congestion level by executing at least one policy based on the at least one priority characteristic of the at least one endpoint.

In some embodiments detecting that the communication congestion level exceeds the congestion threshold may include detecting more than a first number of floor control requests within a first amount of time, detecting more than a first percent of the airtime being used for communications within the virtual talk group, or detecting that less than a second percent of the airtime is not being used for communications within the virtual talk group.

In particular embodiments tracking the at least one priority characteristic for the at least one endpoint of the plurality of endpoints within the virtual talk group may include tracking a role or rank associated with the least one endpoint of the plurality of endpoints within the virtual talk group or tracking at least one feature of the respective communication network associated with the at least one endpoint of the plurality of endpoints within the virtual talk group.

In some embodiments reducing the congestion level may include preventing a first endpoint of the plurality of endpoints from transmitting a communication to at least one other endpoint of the plurality of endpoints of the virtual talk group. Particular embodiments may further include sending a downgrade alert message to the first endpoint alerting the first endpoint that the first endpoint will no longer be able to transmit a communication to the at least one other endpoint of the plurality of endpoints of the virtual talk group. Some embodiments may further include receiving an override request from the first endpoint requesting that the first endpoint remain able to transmit a communication to the at least one other endpoint of the plurality of endpoints of the virtual talk group.

In accordance with another embodiment, a system for providing congestion management within a virtual talk group includes an interface operable to facilitate communication within a virtual talk group between a plurality of endpoints of different communication networks and to monitor a communication congestion level within the virtual talk group. The system also includes a processor coupled to the interface. The processor is operable to track at least one priority characteristic for at least one endpoint of the plurality of endpoints within the virtual talk group and to detect that the communication congestion level exceeds a congestion threshold. The processor is further operable to reduce the congestion level by executing at least one policy based on the at least one priority characteristic of the at least one endpoint.

Technical advantages of particular embodiments include systems and methods for reducing the congestion level within a virtual talk group based on the relative priority of the users of the virtual talk group. Accordingly, the congestion may be reduced without effecting the communication capabilities of higher priority users. Another technical advantage of particular embodiments includes providing notification that one or more users are about to lose the ability to transmit communications within the virtual talk group. If the notification is only sent to the user(s) that are about to be downgraded then the user(s) about to be downgraded may be able to take any appropriate action such as requesting an override, quickly finishing his current communication, and/or informing anyone who might need to know of the change. If the notification is also sent to the other members of the virtual talk group the other members may be kept apprised of the situation within the virtual talk group.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which:

FIG. 4 illustrates a method for providing congestion management within a virtual talk group, in accordance with a particular embodiment.

DETAILED DESCRIPTION

Figure 1:
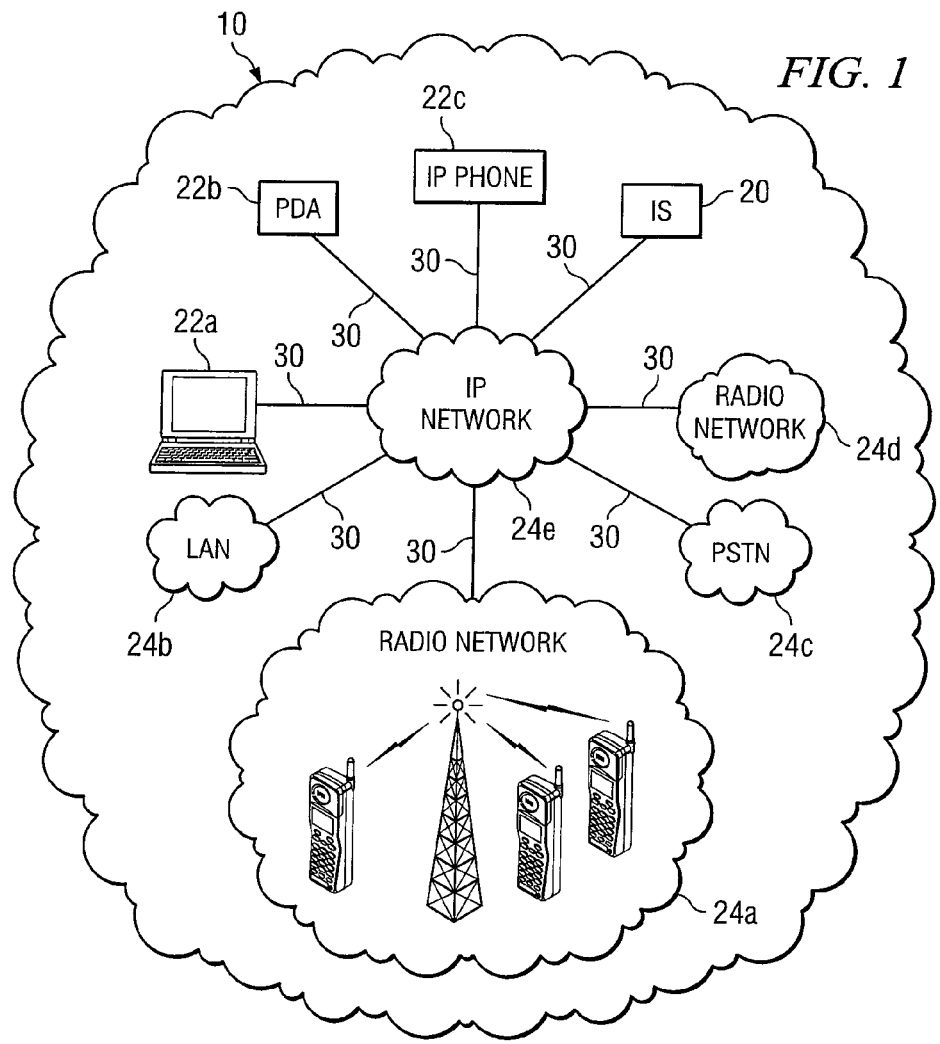
FIG. 1 illustrates a communication system with various communication networks and an interoperability system, in accordance with a particular embodiment.

FIG. 1 illustrates a communication system 10, in accordance with a particular embodiment. Communication system 10 includes communication networks 24a-24e, interoperability system (IS) 20 and endpoints 22a-22c. IS 20 is able to facilitate interoperable communication sessions between and among various communication devices, such as endpoints of communication networks 24 and endpoints 22. IS 20 uses a systems approach to offer a framework based on IP protocols and services to immediately achieve secure voice, video and other data interoperability among communication endpoints and networks utilizing different technologies.

In particular embodiments IS 20 may group two or more endpoints into a virtual talk group (VTG). IS 20 may then allow each endpoint within a VTG, regardless of their respective communication device (e.g., cell phone, telephone, mobile radio), their device's own communication network, and/or technology (e.g., microwave, landline, radio frequency), to communicate with the other members of the VTG. As the number of endpoints communicating within a VTG increase, the level of congestion may also increase. In order to prevent stifling or scrambling communications, IS 20 may attempt to bring the congestion level down if it exceeds a predetermined threshold. For example, in some embodiments, upon detecting the congestion level reaching a certain level, IS 20 may designate certain endpoints as not being able to transmit communications, thus reducing the number of endpoints that are able to actively transmit communications. In determining which endpoints to restrict IS 20 may use any of a variety of different schemes, protocols, algorithms, factors or hierarchies. Furthermore, in particular embodiments IS 20 may provide either the restricted endpoints or all the endpoints within the virtual talk group with some sort of notification or warning that particular endpoints are about to have their communication capabilities downgraded and may no longer be able to transmit communications. Some embodiments may include the ability for a user to override a determination that an endpoint is to be downgraded so as to avoid an undesirable situation in which IS 20 improperly downgrades a particular endpoint.

In the illustrated embodiment, communication networks 24a and 24d comprise radio networks (RNs), communication network 24b comprises a local area network (LAN), communication network 24c comprises a public switched telephone network (PSTN) and communication network 24e comprises an IP network. It should be understood, however, that communication system 10 may comprise any number of IP or non-IP communication networks of any wireless or wireline form capable of communicating audio and/or video telecommunication signals, data, and/or messages, including signals, data or messages. Communication networks 24a-24e may include any number and combination of segments, nodes and endpoints to enable communication among network devices and components. Communication networks 24a-24e may be distributed locally or across multiple cities and geographic regions. Nodes may include any combination of network components, gatekeepers, call managers, conference bridges, routers, hubs, switches, gateways, base stations, endpoints or other hardware, software or embedded logic implementing any number of communication protocols that allow for the exchange of data in communication system 10. Segments 30, which may comprise any suitable wireless or wireline communication links, including one or more communication networks (e.g., WANs) as appropriate, couple various networks with each other and with endpoints 22 and IS 20. In particular embodiments, segments may include gateways for facilitating communication between various networks, such as an LMR gateway between radio network 24a and IP network 24e.

In some cases, users of endpoints of one of communication networks 24a-24e may communicate with endpoints of another of communication networks 24a-24e through IS 20. IS 20 may facilitate the communication between endpoints of different networks by itself rebroadcasting the communications of one network to another network or IS 20 may cause other components which it may control to rebroadcast the communication. A radio network, such as radio network 24a or 24d, may support communication among portable mobile station endpoints, such as LMRs, using any suitable communication methods or features, such as cellular or push-to-talk (PTT). Communication networks 24a-24e may comprise networks of particular groups or agencies (e.g., a municipality's police department network), whether operational with respect to a particular area or otherwise.

IS 20 enables, facilitates and/or provides for interoperable communication among communication endpoints and devices, such as LMRs, cellular phones, IP phones, PCs, PDAs, PSTN phones, video monitors, cameras and sensors of one or more communication networks (e.g., communication networks 24a-24e) using Internet Protocol. Such endpoints may comprise IP or non-IP-enabled endpoints. In particular embodiments, IS 20 may control gateways (e.g., via segments 30) in order to map radio frequencies of particular mobile radio endpoints to IP addresses for communication to other types of radio endpoints or IP devices. For example, a particular gateway may be able to receive communications from various types of endpoints (e.g., on various types of communication networks) and may convert such communications for transmission to other types of endpoints. IS 20's control of the gateway may control the various endpoints and/or networks that receive particular communications, depending on system functionality and configuration. As indicated, such control may include the mapping of communications and endpoints to IP addresses for interoperable communication. In some embodiments, IS 20 may host audio conferences that bridge communications received from endpoints. As indicated above, communication system 10 (including IS 20) may include any suitable number or type of gateways (e.g., LMR and PSTN gateways), servers (e.g., multipoint conference servers), switches, routers, firewalls, access points, processors, memory or other hardware, software or encoded logic to provide the functionality described herein. IS 20 is coupled to communication networks 24a-24d and endpoints 22 through IP network 24e, which may comprise any suitable IP network.

As indicated above, IS 20 uses IP to enable communication among endpoints of various networks. The manner in which IS 20 facilitates communication among endpoints may vary according to location and system or operational needs. For example, IS 20 may communicate with endpoints using multicast IP addresses assigned to an endpoint of a communication network, a group of endpoints of a communication network or one or more endpoints of multiple communication networks or alternatively using a peer to peer dialed connection or a nailed dialed connection. A group of endpoints may be combined into a VTG for communication using a particular IP address. As an example, the VTG group may be assigned a multicast IP address through which users of various endpoints may communicate in the VTG. The use of multicast IP addresses allows IS 20 to facilitate communication among communication devices and endpoints of various communication networks to provide audio, data, video and control network interoperability. As an additional example, in some cases multicast streams (e.g., utilizing multicast IP addresses) may be used. In some cases nailed dialed connections, such as those using SIP protocol, may be used for communication among endpoints and with IS 20. Various embodiments may combine communication methods to facilitate communication among endpoints. For example, in some cases certain endpoints of a VTG may participate in the VTG through a multicast IP address while other endpoints may utilize a nailed SIP connection. IS 20 may control this participation, such as by controlling gateways, multipoint conferences and the mapping of communications to IP addresses.

IS 20 may be utilized and implemented in any number of market segments, such as enterprise safety and security (e.g., loss prevention), transportation, retail, public safety and federal agencies in order to provide radio and non-radio network interoperability within and between such market segments. As indicated above, such network interoperability includes the interoperability of push-to-talk voice technology within various networks and the interoperability between push-to-talk and full duplex dialed connections.

Endpoints 22 and IS 20 may be any combination of hardware, software, and/or encoded logic that provides communication services to a user. In the illustrated embodiment, endpoints 22 comprise a PC (endpoint 22a), a PDA (endpoint 22b) and an IP phone (endpoint 22c). However, in other embodiments, endpoints 22 may include a telephone, a video monitor, a camera, a cell phone, a land mobile radio (LMR), a command center or any other communication hardware, software and/or encoded logic that supports the communication of audio, video or other data, using packets of media (or frames) or otherwise, through communication system 10. Endpoints 22 as well as endpoints and components of communication networks 24 may be capable of communicating using any particular type of technology, such as cellular, IP, PSTN, code division multiple access (CDMA), global system for mobile communication (GSM), time division multiple access (TDMA), and satellite. Endpoints 22 and IS 20 may also include unattended or automated systems, gateways, other intermediate components or other devices that can establish media sessions.

Although the illustrated embodiment includes five communication networks 24a-24e, the term "communication network" should be interpreted as generally defining any network capable of transmitting audio and/or video telecommunication signals, data, and/or messages, including signals, data or messages. Any one of networks 24a-24e may be implemented as a local area network (LAN), wide area network (WAN), cellular network, global distributed network such as the Internet, Intranet, Extranet, PSTN, LMR network, radio network (RN), CDMA network, GSM network, TDMA network, satellite network or any other form of wireless or wireline communication network.

Communications over communication networks 24a-24e may use any suitable communication protocol. In a particular embodiment, some communication networks may employ voice communication protocols that allow for the addressing or identification of endpoints, nodes, and/or other components coupled to the communication network. For example, using internet protocol (IP), each of the components coupled together by, for example, communication network 24b in communication system 10 may be identified in information directed using IP addresses. In this manner, network 24b may support any form and/or combination of point-to-point, multicast, unicast, or other techniques for exchanging media packets among components in communication system 10. Any network components capable of exchanging audio, video, or other data are included within the scope of the present invention.

Since IP networks share a common method of transmitting data, telecommunication signals may be transmitted between telephony devices located on different, but interconnected, IP networks. In addition to being coupled to other IP networks, communication network 24b may also be coupled to non-IP telecommunication networks, for example through the use of interfaces or components, including gateways. In the illustrated embodiment, communication network 24b may be coupled with PSTN 24c through a gateway. In some embodiments the gateway may be a part of IS 20 or network 24e. PSTN 24c includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 24c), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, one or more of endpoints 22, and endpoints and components of communication networks 24 may be IP telephony devices capable of participating in IM, video, and other multimedia communication sessions. IP telephony devices have the ability to encapsulate a user's voice (or other input) into IP packets so that the voice can be transmitted over a communication network. IP telephony devices may include telephones, fax machines, computers running telephony software, nodes, gateways, wired or wireless devices, hand held PDAs, or any other device capable of performing telephony functions over an IP network.

In particular embodiments, communication system 10 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

In some embodiments communication system 10 may facilitate communications, such as half-duplex PTT communications, in which a person desiring to speak must gain "floor control" in order for his communication to be heard by others. Such a user may typically not be able to gain floor control when another user already has control of the floor (e.g., when another user is speaking). To gain floor control, the user may transmit a floor control request (e.g., when he pushes a transmit button on his LMR, the LMR may automatically transmit a floor control request). The communication system may notify the user if he has gained floor control by, for example, an audible beep. When two or more users request floor control at, or around, the same time their requests may be said to collide resulting in only one of the users gaining control of the floor. Particular embodiments may implement this floor control functionality, both with respect to half and full duplex endpoints.

Although FIG. 1 illustrates a particular number and configuration of endpoints, IS and communication networks, communication system 10 contemplates any number or arrangement of such components for communicating media.

Figure 2:
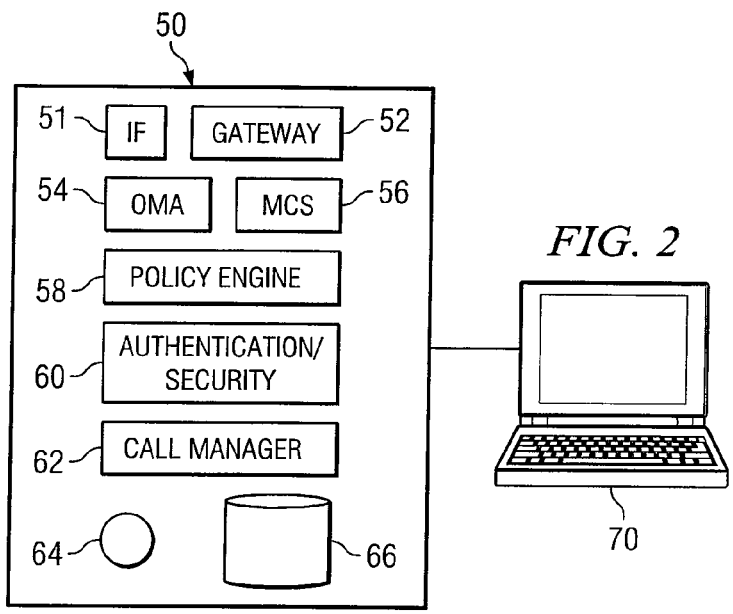
FIG. 2 illustrates an example interoperability system, in accordance with a particular embodiment.

FIG. 2 illustrates interoperability system (IS) 50, in accordance with a particular embodiment. IS 50 may be similar to and provide analogous functionality as IS 20 of FIG. 1. In the illustrated embodiment, IS 50 includes interface 51, gateway 52, operations management application (OMA) 54, multipoint conference system (MCS) 56, policy engine 58, authentication and security system 60, call manager 62, processor 64 and memory module 66. IS 50 is coupled to a PC endpoint 70 that may be used to access, configure and control various functionality provided by IS 50. PC endpoint 70 may run a client application for such access, configuration and control. The client application may enable a user of endpoint 70 to receive and monitor communications from various endpoints and virtual talk groups. In particular embodiments, other types of endpoints may be utilized to access, configure and control IS 50, such as IP phones, web based thin clients, PDAs and mobile devices. IS 50 may be coupled to such endpoints (including PC endpoint 70) through one or more communication networks.

Interface 51 may be used in the communication of audio, video, signaling and other data between IS 50 and other network components. For example, interface 51 may receive communications from endpoints such as endpoints of communication networks 24, endpoints 22 and endpoint 70. The communication may take place over IP networks thereby negating the need for dedicated wiring between the endpoints and the IS.

Gateway 52 may include any suitable number and/or type of gateways to provide network interoperability and back-end legacy application integration, such as LMR gateways, PSTN gateways and application gateways. Gateway 52 may provide mapping between IP services and the interoperable networks, such as LMR network 24a of FIG. 1. In some cases gateway 52 may not be located within an IS but may be distributed throughout a communication system for enabling communication among various communication networks.

Operations management application (OMA) 54 may include functionality for configuration, management and control of IS 50, including conference and collaboration management, and may be accessed by a user via, for example, PC endpoint 70. In particular embodiments, OMA 54 may enable a user, such as dispatch personnel, an administrator or a mobile user (e.g., a first responder mobile user) accessing IS 50 via a mobile endpoint, to configure, manage and participate in one or more virtual talk groups and ad hoc conferences simultaneously. In particular embodiments, OMA 54 may be accessed through a web interface functioning, for example, as a soft phone for radios. A screen display may be controlled using a mouse, keypad, touch screen, voice commands or any other suitable interface. OMA 54 screen displays may include any number of functional controls to provide interoperable communication. OMA 54 may authenticate a user and obtain user configuration information upon a user accessing the OMA. OMA 54 may monitor and provide communication ability for any number of channels and modalities at one time to provide the ability for an OMA user to communicate on and control multiple virtual talk groups at once.

Multipoint conference system (MCS) 56 may provide collaboration and conference services for multiple endpoints of one or more networks. For example, users of multiple endpoints (such as LMRs of different networks (e.g., networks of different agencies or groups) and different types of endpoints of different networks) may be bridged together through MCS 56 to provide virtual talk group communication. MCS 56 may include any suitable number and type of conference bridges, ports, digital signal processors or other components to facilitate the communications discussed herein.

Policy engine 58 may include policies for undertaking various operations and functionality upon the occurrence of various events to provide dynamic incident management. These policies may include both predetermined and ad hoc policies. For example, upon detecting that a VTG's congestion level has reached a certain threshold a predetermined policy may be executed to reduce the congestion level by, for example, downgrading the communication capabilities of certain endpoints.

The congestion level may be based on any number of different factors depending on operational needs. For example, the congestion level may be based on a number of floor control requests, the number of collisions between floor control requests, the number of users within the VTG, the amount of communication or silence, the percent of system usage or idleness, the number of times a lower priority communication is preempted by a higher priority communication, or any combination of the above factors as well as any other factors that may aid in determining the congestion level within a VTG. Furthermore, any of the factors may be combined with a time element. For example, in some embodiments policy engine 58 may base the congestion level on the number of floor control requests detected per minute, the number of instances in which less than a certain amount of time has passed between communications (e.g. 10 occurrences wherein the time between communications is less than 3 seconds) resulting in several failed attempts to gain control of the floor. In addition the type of communication system being used may also affect the congestion level. More specifically, communications from a communication system that requires more resources to transmit or receive a communication may have more of an impact on the congestion level than communications within a communication system that uses fewer resources to transmit or receive a communication.

Authentication and security system 60 may be used to manage access, configuration and control privileges for users of IS 50 and those participating in interoperable communication. For example, different users may have different privileges assigned for interoperable communication. Some users may only have transmit or listen privileges with respect to one or more particular talk groups, while other users may have the ability to communicate in all talk groups or setup and configure various talk groups. User privileges may change dynamically upon the occurrence of particular events and/or changes in the congestion level of the respective VTG.

Call manager 62 may maintain information regarding various users, such as users of IP networks for which interoperable communication is provided by IS 50. This facilitates in the extension of PTT to IP networks and in the provision of voice and data interoperability across radio and non-radio networks. In particular embodiments, call manager 62 may maintain a listing, table, or other organization of information about users. The information may include a name or other identifier and contact information such as phone numbers and email addresses for the users. In some embodiments, the information about users may be maintained within other components coupled to the call manager 62 through the network so that call manager 62 may use the network to access the information about users. In particular embodiments call manager 62 may represent any appropriate combination of hardware, software and/or encoded logic distributed throughout a communication network coupled with IS.

Processor 64 may be a microprocessor, controller, or any other suitable computing device, resource, or combination of hardware, software and/or encoded logic operable to provide, either alone or in conjunction with other IS components such as OMA 54, IS 50 functionality. Such functionality may include providing various features discussed herein to a user, such as a user of an endpoint accessing IS 50 through OMA 54. Such features may include performing congestion management functions, assigning users to a VTG enabling the user to listen to and/or participate in communications involving endpoints and/or virtual talk groups associated with a particular event or within a particular geographic area, presenting the communications of endpoints of scene-related virtual talk groups according to preconfigured or received instructions and controlling various gateways and other network components to facilitate interoperable communication among various endpoints.

Memory module 66 may be any form of volatile or non-volatile memory including, without limitation, magnetic media, optical media, random access memory (RAM), read-only memory (ROM), removable media, or any other suitable local or remote memory component. Memory module 66 may store any suitable data or information, including software and encoded logic, utilized by IS 50. In particular embodiments, memory module 66 may include data for user management, talk-group management, resource pool management, privileges, backup configuration and information and/or timestamp and activity tracking. For example, memory module 66 may maintain a table containing the relative priorities of the users of a particular VTG. The table may be updated as users are added to or removed from the VTG and/or as other circumstances change during the course of the VTG.

IS 50 may also include any number of switches, routers, firewalls, mobile access routers, access points, wireless bridges and other components in order to accommodate particular operational desires and needs.

In particular embodiments such as in the LMR network interoperability context, IS 50 may, through one or more components discussed above or through other components, encode received audio with a standard audio codec, such as G.711 or G.729. Those audio samples may be packaged in standards-based real-time transport protocol (RTP) packets suitable for transport on an IP network. At this point, the communication element may be abstracted from the distinctive characteristics of each radio system. These audio packets can be sent across the network to other radio systems either individually (unicast) or as a group (multicast). The recipient of the audio packets may be a device capable of receiving and decoding the RTP stream, such as an IP telephone or PC with appropriate software. The IP network and IP-enabled devices can be used to allow users to monitor or transmit on a particular radio channel from a desk without issuing another radio.

As indicated above, IS 50 may facilitate communication among users of endpoints of various networks through virtual channels or talk groups. For example, a channel may comprise a unidirectional or bidirectional path for transmitting and/or receiving electrical or electromagnetic signals. This may comprise, for example, a conventional radio physical RF channel. A talk group in this context may be a subgroup of users (e.g., radio users) who share a common functional responsibility and typically coordinate actions amongst themselves without radio interface with other subgroups. For example, a municipality's police department network may include various talk groups.

A VTG may represent interoperability of a group of channels, for example, as an audio conference or meeting. A VTG may include an associated virtual channel and an ID. Virtual channels may comprise an address, such as an IP address, associated with a virtual talk group through which users may access the virtual talk group and/or through which communications from VTG member-endpoints are bridged. Various types of virtual talk groups may be utilized in particular embodiments, such as a multicast address usable by all endpoints of the VTG, a VTG comprising multiple talk groups (e.g., multiple radio sources from different frequencies whose communications are mixed), a unicast group and a combination unicast and multicast group. In some situations a VTG may be formed by combining a plurality of VTGs.

As an example, a particular virtual talk group may comprise a conference or meeting of the following: (1) a channel or other multicast path used by certain users of a police department's radio network, (2) a channel or other multicast path used by certain users of a fire department's radio network, (3) a channel or other multicast path used by certain users of a corporation's security radio network and (4) a plurality of users of IP-enabled endpoints such as IP phones, IP-enabled PDAs or PCs. An operator of IS 50 may configure the virtual talk group using any suitable interface, such as by dragging and dropping the included channels and IP endpoints into a single area representing the virtual talk group. The VTG may also be configured by IS 50 through, for example, the use of OMA 54, policy engine 58, and processor 64, according to an organization's defined polices. During the life of a VTG the communication traffic may exceed the functional limits of the hardware and/or software of either IS 50 or one of the communication networks being used with the VTG. In response IS 50 may attempt to reduce the congestion level by downgrading the communication capabilities (e.g., preventing a user from transmitting an audible communication) of some of the endpoints within the overly congested VTG.

As indicated above, IS 50 may monitor the congestion level within VTGs. For example, IS 50 may monitor the number of users within a particular VTG or the number of communications or attempted communications within a particular VTG. In some embodiments, in determining whether a VTG has become overly congested IS 50 may, for example, use OMA 54 to monitor the number of users within a particular VTG. If this number reaches a congestion level specified in policy engine 58 (e.g., 100 or more users within a single VTG), IS 50 may determine that the VTG is too congested. In particular embodiments IS 50 may, for example, use interface 51 to detect the number of requests for floor control that are received from users within a particular VTG. If this number reaches a congestion level specified in policy engine 58 (e.g., five or more requests per ten seconds), IS 50 may determine that the VTG is too congested. In some embodiments IS 50 may, for example, use interface 51 to detect the number of times communications within a particular VTG are preempted. If this number reaches a congestion level specified in policy engine 58 (e.g., three or more preemptions per minute), IS 50 may determine that the VTG is too congested.

As discussed above, regardless of the communication systems used by the users within a VTG, IS 50 has the capability to monitor, for example through IF 51, gateway 52, or other gateways or components of the communication system, communications transmitted within a VTG. To detect a communication within a half-duplex communication system, such as a PTT network, IS 50 may detect a request for floor control, such as a request for a 'token.' To detect a communication within a full-duplex communication system, such as a PSTN network, IS 50 may detect signal levels above a set threshold (the set threshold may be greater than the signal level for background noise).

If IS 50 detects that the congestion level has become too high, for example three floor control request collisions within ten seconds, IS 50, through for example policy engine 58, may designate certain users within the congested VTG as not being able to transmit communications. In some embodiments this designation may depend on the relative priorities of the users based on the policies of the particular IS 50. Depending on the embodiment the policies of IS 50 may include different factors, such as: (i) the role and/or responsibilities of the user, (ii) the importance and/or rank of the user, (iii) the communication patterns/history of the user, (iv) interactions between particular users, (v) the location of the user, and (vi) an organization's predetermined operating procedures. IS 50 can use these factors, along with others, either individually or in combination with each other to determine the relative priority of the users. During the course of the VTG, this designation may change. For example, should several endpoints leave the VTG, IS 50 may once again allow those endpoints that were prohibited from transmitting communications to transmit communications.

Even after IS 50 has caused the communication capabilities of some of the users of the VTG to be downgraded, those users may still be able to receive the other users' communications. Furthermore, policy engine 58 may recognize that some or all of the users of the subgroup are at endpoints capable of communicating using an alternate communication method, such as IM. Accordingly, Is 50 may not propagate audible communication from these downgraded users but may still allow the transmission of IM messages. In this situation IS 50 may still transmit the audible communications of the other users within the VTG to the downgraded users but would not allow them to respond with their own audible communications. This may reduce the amount of audible communication within the VTG and thus lower the congestion level.

Furthermore, in some embodiments, those users whose communication abilities are downgraded in order to relieve congestion may still be able to communicate normally within their own communication network. For example, assume IS 50 has formed a VTG with users from two different communication systems (e.g., firefighters using a first channel and police officers using a second channel). Within this VTG the congestion level has risen above the predetermined congestion level. IS 50 has downgraded the communication abilities of four users within the VTG, two firefighters and two police officers. When one of the two police officers attempts to transmit a communication, all the police officers using the second channel may receive the communication; however none of the firefighters using the first channel will receive the communication because IS 50 may prevent the communication from being retransmitted over the first channel.

It should be noted that downgrading the communication ability of some of the users within the VTG may not effect how the remaining users of the VTG communicate. The only change, from their perspective, may be that there are now fewer users transmitting communications within their VTG.

Because there may be instances where IS 50 makes an assignment that is not proper for a particular user, IS 50 may send a notice to the users that are being downgraded before the downgrade is implemented. The length of time between sending the notice and implementing the downgrade may vary depending on the situation and/or the policies of policy engine 58. Generally the length of time will be sufficiently long to provide a user with an opportunity to prepare himself and others for the downgrade or to send an override request.

The override request is essentially a request to not have the user's communication capabilities downgraded. The override request may or may not be granted. In some embodiments the override request may automatically be granted by IS 50. In particular embodiments the override request may be forwarded to another user of the VTG, the user that receives the forwarded override request may then make the determination of whether or not to grant the override request. Whether an override request is granted may depend on the user sending it, the situation in which the user is involved and/or any other policies or procedures that are used by IS 50.

MCS 56 may provide the functionality for the conference of the virtual talk group members. In particular embodiments, multiple talk groups may be patched together on a dynamic, as needed basis. In some cases a virtual talk group may not necessarily include communications through an IS but may instead include member endpoints whose communications are mapped to IP addresses at gateways (such as LMR gateways) controlled by an IS.

Any number of virtual talk groups may be configured to provide any suitable audio, data, video and control network interoperability. Virtual talk groups may be created using any suitable user/endpoint groups or channels based on location, organizational requirements, event requirements or any other suitable characteristic. An administrator or operator may configure channel details such as name, description, participants, multicast IP addresses, codec and latch options through, for example, OMA 54.

Figure 3:
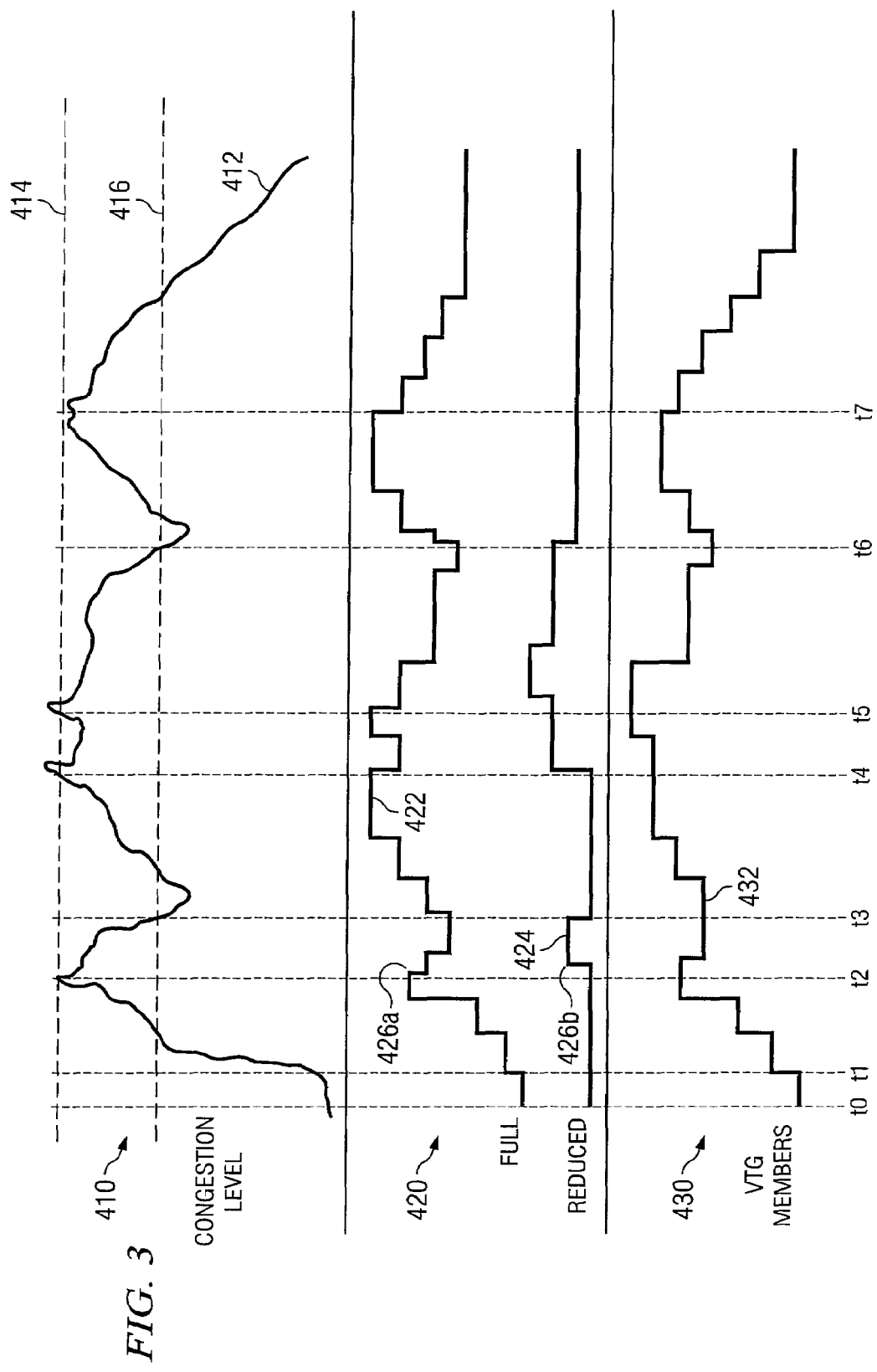
FIG. 3 illustrates a plurality of charts representing the congestion level and communication capabilities of users within a virtual talk group over time, in accordance with a particular embodiment.

FIG. 3 illustrates a plurality of charts representing the congestion level and communication capabilities of users within a virtual talk group over time. Top chart 410 includes congestion level 412, upper threshold 414 and lower threshold 416. Middle chart 420 includes full capability level 422 and reduced capability level 424. Bottom chart 430 includes VTG member level 432. More specifically, congestion level 412 represents the amount of congestion within a VTG being monitored by an IS, full capability level 422 represents the number of users within the VTG that are able to transmit and receive communications without any reduction in their communication capabilities, reduced capability level 424 represents the number of users within the VTG that have downgraded communication capabilities (e.g., they can not transmit communications), and VTG member level 432 represents the number of users within the VTG.

Congestion level 412 may be based on any congestion detection scheme described above with respect to FIG. 2 as well as any other scheme, or combination of schemes, which may be appropriate. For example, in some embodiments congestion level 412 may track the number of communications transmitted or the communication transmission rate, the ratio of time in which someone is transmitting a communication to time in which there are no transmitted communications, the number of preempted communications, or the number of collisions between requests for floor control. Upper threshold 414 and lower threshold 416 may be determined, in part, based on how congestion level 412 is determined. More specifically, if congestion level 412 is based on the rate at which collisions between floor control requests are detected, then upper threshold 414 may be set at a level that corresponds to three collisions detected within a ten second span.

In some embodiments the IS may be able to determine the congestion level by monitoring communications. For example, a communication from a user of a VTG may be communicated through a base station and/or other components of one or more communication networks and received at the IS. The IS then knows that a communication is being transmitted. Furthermore, in some embodiments the IS may also then retransmit the communication, or otherwise cause the communication to be retransmitted, to any other users that are within the VTG but which are not a part of the same radio network (e.g., the communication has not otherwise been transmitted to other endpoints of the VTG).

The IS monitors the congestion level to determine when or if the congestion level within the VTG exceeds a predetermined threshold. The level at which the IS intervenes and attempts to reduce the congestion is shown as upper threshold 414. Upper threshold 414 may depend on such factors as how the IS is monitoring the congestion level, what policies are in place, the circumstances and/or settings of the VTG, the overall system capabilities, and/or any other factors that may be advantageous to consider when determining the upper threshold of congestion. This value may vary from IS to IS and/or from VTG to VTG. While upper threshold 414 may indicate the congestion level at which the IS may attempt to reduce the congestion level, lower threshold 416 may indicate the congestion level at which the IS may attempt to restore the communication capabilities of those users whose capabilities where downgraded.

The way in which a user's ability to communicate is downgraded may depend on the type of endpoint they are using, the abilities of the communication network, and/or the configuration and policies of the IS. For example in a radio network the IS may not be able to prevent a user from transmitting a communication to other users using the same radio channel, but the IS may prevent the communication from being rebroadcast to other users on different radio channels or different communication networks. Another example may involve a user on a cell phone who may be prevented from having their audible communications transmitted to the other users of the VTG but the user may be allowed to transmit text messages to those users within the VTG that have the ability to receive text messages. Yet another example may involve a user of an IP endpoint may have the bandwidth or quality of his transmitted communications reduced. As may be apparent, there are several possibilities for how the IS may reduce the congestion, and all such possibilities are within the scope of particular embodiments.

To provide a background for the discussion of FIG. 4 assume that the three charts reflect the activity of a virtual talk group formed in response to a fire. Further assume that a new VTG is created at time t0 to allow users responding to the fire to be able to communicate with one another. Initially VTG member level 432, reduced capability level 424, full capability level 422, and congestion level 412 are all at 0 because there are not yet any users assigned to the VTG and no communications have been transmitted, thus no congestion. Then, at time t1 the first user joins the VTG. For purposes of this example the first user is a dispatcher from a fire station responsible for overseeing this VTG.

Once the dispatcher is part of the VTG she may begin to add additional users. For example, the dispatcher may add the radio associated with the fire truck that has been assigned to put out the fire, and then she may add an ambulance that has been dispatched to the fire. As discussed above, the users added to the VTG may be part of different networks, such as different radio networks of different public or private agencies or groups. For example, the fire truck may be using a land mobile radio on a local municipality fireman's network while the ambulance may be using a land mobile radio on a different municipality's emergency response network. The IS allows for endpoints of different agencies to easily communicate with one another. As discussed above, with respect to IS 50, the IS, through Internet Protocol, enables various endpoints of different networks to communicate in talk groups using the technology of their respective networks.

After the dispatcher has successfully directed the fire truck to the fire, several of the fire men may have their own radios that are added to the VTG. This can be seen in the relatively large rise preceding time t2. Congestion level 412 may rise as the different users are added to the VTG and begin to transmit communications. At time t2 congestion level 412 may rise above upper threshold 414 causing IS to begin to attempt to reduce the congestion level.

In some embodiments, once the IS detects that congestion level 412 has exceeded upper threshold 414 it may begin to take steps to reduce the congestion level. One of the steps the IS may execute may be to determine which user or users of the VTG should have their capabilities reduced. The IS may employ a wide variety of different policies in determining which users should be downgraded and which should retain their full communication capabilities. For example, the IS may consider the relative rank of the users of the VTG. More specifically, the IS may be more likely to downgrade a traffic cop and less likely to downgrade the chief of police. Another example may be for the IS to consider the roles of the users (e.g., the skill or responsibility of the user) within the VTG. More specifically, if the VTG was created to handle a bank robbery the IS may be more likely to downgrade a fire fighter and less likely to downgrade a police officer. Yet another example may be for the IS to consider the capabilities of the communication network and/or the endpoint used by the user. More specifically, the IS may be less likely to downgrade a user using a mobile radio (as discussed above downgrading a mobile radio may not prevent the user from transmitting to other users on the same channel so the downgrade may not have as big an impact on the congestion level) and more likely to downgrade a user who has the ability to communicate via alternate means (e.g., prevent a user from transmitting audible communications but allow them to transmit text communications). Yet another example may be for the IS to consider the overall balance of the VTG. More specifically, the IS may have a policy that a certain ratio of police officers to firefighters to emergency response be maintained. Accordingly, the IS may be more likely to downgrade a user that is upsetting the desired ratio. In some embodiments the IS may determine the relative priority of the users of the VTG by executing one or more different policies. The IS may then simply downgrade the lowest priority user or users.

Once the IS has determined which user or users are to be downgraded it may send a notice alerting the user or users that their communication capability is about to be downgraded. The notice, or one similar thereto, may also be sent to the other users of the VTG so that they are aware of the upcoming downgrade. The notice may be sent a predetermined amount of time prior to the IS downgrading the user's communication capability. The amount of time may be fixed or it may fluctuate, for example, to take into account how far congestion level 412 is above upper threshold 414. In some embodiments the amount of time between the notice and the downgrade may serve as a courtesy, informing the user or users of the impending change. This may allow the user who is going to be downgraded to make any desired arrangements before he is downgraded. In particular embodiments the amount time between determining that a user should be downgraded and actually downgrading the user may provide the user an opportunity to send an override request. The override request may provide the user with the ability to prevent the IS from downgrading his capabilities. This may provide the IS with a fail safe mechanism to avoid a potentially harmful downgrade. In particular embodiments the override request may be received from a different user, such as a dispatcher.

The delay between when the IS detects that congestion level 412 has exceeded upper threshold 414 and when the user is actually downgraded can be seen by looking at charts 410 and 420. At time t2 congestion level 412 has just crossed upper threshold 414. Congestion level 412 continues to rise as the IS determines which user to downgrade, sends the notice, and waits the predetermined amount of time. Once that time has passed the user may be downgraded and the congestion level may begin to drop. The downgrade can be seen at point 426a and 426b where there is a drop in full capability level 422 and a rise in reduced capability level 424.

During the course of the fire users may have to leave. For example, if someone is injured the ambulance may leave the fire take the injured person to a hospital. Because the ambulance is no longer at the scene he may be removed from the VTG. His absence, as noted by the drop in VTG member level 432 between times t2 and t3, may contribute to the continued decline in congestion level 412. At time t3 congestion level 412 has declined far enough to be below lower threshold 416 indicating to the IS that it may now remove the limitations placed on the downgraded user. As before, the IS may provide a notice to some or all of the users alerting them that the downgraded user is about to return to full communication capability.

Similar to upper threshold 414, lower threshold 416 may be set based on any criteria, parameters, or operational needs. Furthermore, in determining the spacing between upper threshold 414 and lower threshold 416 it may be desirable to space them far enough apart that a user is not constantly switching between having full and reduced communication capabilities.

Between time t3 and t4 two new users join the VTG as is seen in VTG member level 432. These two new users may be police officers. As the two new police officers begin to transmit communications the congestion level begins to rise again, eventually exceeding upper threshold 414. As before the IS then selects a user to downgrade, sends a notice, and then downgrades the communication capabilities of the user. However, between time t4 and t5 the ambulance that left earlier has returned, as can be seen by the rise in VTG member level 432 between times t4 and t5. This causes congestion level 412 to again rise above upper threshold 414 triggering a decongestion response from the IS.

Now assume that some time later, between times t5 and t6, a police officer finds the person who set the fire and that person is injured. Accordingly, one of the police officers rides with the ambulance to take the arsonist to the hospital. This can be seen in the first large drop in VTG member level between times t5 and 56. Looking at chart 420 there is a drop in full capability level 422 and reduced capability level 424 that corresponds with the first large drop in VTG member level between times t5 and t6. This is because the ambulance was one of the users that was downgraded. Therefore, when the police office and the ambulance left, only one user (the ambulance) having full communication capability was removed. It should be noted that in this embodiment the IS did not then automatically upgrade the remaining downgraded endpoint to fill the vacancy created by the departed ambulance. Rather it is not until time t6 when the congestion level falls below lower threshold 416 that the user is upgraded.

After time t6 two more users join the VTG, but by now the fire is pretty well under control and the amount of communication has died down. Because the congestion level, even with the additional users, is not above upper threshold 414 the IS does not attempt to downgrade any of the users. Then assume that at time t7 the fire is put out and one by one the users leave the scene and the VTG.

It will be recognized by those of ordinary skill in the art that the endpoints and interoperability systems disclosed herein are merely example configurations in accordance with particular embodiments. These systems may include any number of interfaces, processors, memory modules, or other components to accomplish the functionality and features described herein. In addition, these components and other desired components for performing the above described functionality may be centrally located (local) with respect to one another, or distributed throughout communication systems and networks. In addition, one or more components of these systems and devices may work together in performing various functionality described herein.

FIG. 4 illustrates a method for providing congestion management within a virtual talk group in accordance with a particular embodiment. The method begins at step 510 where an IS facilitates communication within a virtual talk group (VTG). The VTG may have been created by the IS or by a user, such as a dispatcher, interacting with the IS through a user interface. As discussed above, the IS may allow the users of the VTG to freely communicate with one another regardless of whether they are using different communication networks and/or technologies.

Because the IS may allow users from different networks to communicate with one another it may be possible to create a VTG in which users from several different communication networks are joined together. This may be desirable in emergency situations in which inter-agency cooperation and communication is needed. However, as may be apparent, the more users there are in a VTG the more communications there are that are going to be transmitted. This may prevent a higher priority user, such as a commanding officer, from being able to gain control of the floor so as to transmit his communication. Accordingly, at step 520 the IS monitors the communication congestion level within the VTG.

The IS may determine the congestion level using any of a variety of factors, parameters, policies, or algorithms that may be desired. For example, in some embodiments the congestion level may be based on the number of floor control requests or preempted communications that are detected within a certain amount of time. In particular embodiments the congestion level may be based on the IS monitoring the transmission of communications. More specifically, in some embodiments the congestion level may be based on amount of free time between communication transmissions, or the amount of time during which communications are being transmitted.

Besides monitoring the communication congestion level, at step 530 the IS may also track at least one priority characteristic of a user within the VTG. The type of priority characteristic(s) the IS tracks may be as varied as the operational needs in which the IS is deployed. Some possible types of priority characteristics may include: the rank of a user (e.g., captain, lieutenant, detective); the seniority of a user (e.g., the user's age, length of time in a particular position); the user's role, responsibility, specialty or other type of capability (e.g., a firefighter, a forest firefighter, a police officer, a highway patrolman); the communication technology or network the user is using (e.g., LMR, cell phone, PSTN); the communication history of the user (e.g., how long he has talked, how often he talks); and the user's location. Other embodiments may use other factors, while some embodiments may combine multiple different factors. For example, in some embodiments the IS may receive a message indicating the purpose of the VTG, based on the VTG's purpose the IS may prioritize users based on who is best suited to respond the VTG. More specifically, the IS may give an emergency medical technician (EMT) a higher priority if it knows that the VTG was created in response to a car accident as opposed to if the VTG was created in response to a wild fire in an uninhabited area.

In some embodiments the IS may be able to determine a user's priority on its own. For example, the user's communication device may embed information (e.g., a user ID, a device ID) that the IS may use to determine one or more priority characteristics of the user. The IS may also be able to determine a user's role/responsibility from the communication network she is using (e.g., if the user is using an RF channel associated with a fire department the IS may determine that the user is a firefighter). In particular embodiments a user, such as a dispatcher, may provide the IS with information that may be used to determine one or more priority characteristics for a user. For example, a dispatcher may be able to enter a user's name which the IS may then use to determine the user's rank.

If the communication level rises to a certain level then at step 540 the IS detects that the communication congestion level has exceeded a congestion threshold. The congestion threshold may be based, in part, on how the IS monitors the congestion level. More specifically, if the IS is monitoring the number of floor control requests then the congestion threshold may be based on the number of collisions of floor control requests within a certain amount of time; if the IS is monitoring the number of communications from a lower priority user that are preempted by communications from higher priority users then the congestion level threshold may be based on a number determined to be an acceptable number of preemptions; if the IS is monitoring the amount of free time between transmissions then the congestion level may be based on a particular percent of free airtime; and if the IS is monitoring the amount of time in which communications are being transmitted then the congestion threshold may be based on a particular percent of the airtime being used. The actual value of the threshold value may depend on the capabilities of the communication network (e.g., a network that has more available bandwidth for transmitting communications may have a higher congestion threshold than a network with less available bandwidth). In some embodiments the value of the congestion threshold may based on the preferences of the user operating the IS. For example, the congestion level may be higher if the operator determines that it is acceptable for some communications to be delayed or lost.

Regardless of how the congestion level is monitored or what the congestion threshold is set to, if the congestion level exceeds the congestion threshold the IS executes a policy based on the priority characteristic at step 550. The execution of the policy reduces the congestion level in the VTG. The policy may take into account the relative priority characteristics of the users within the VTG to determine which user or users will have their communication capabilities downgraded (e.g., prevented from transmitting communications). More specifically, based on the priority characteristics tracked at step 530, the IS may be able to identify the lowest priority user or users. These low priority users may be the users whose communication capabilities are downgraded.

Then, at step 560 the IS sends a downgrade alert message to the first endpoint (e.g., the endpoint having the lowest relative priority) alerting the first endpoint that her communication capabilities are about to be downgraded. In some embodiments the downgrade alert message may be sent to other users within the VTG so that they are made aware of the first user's situation. In particular embodiments, after the first user receives the downgrade alert message she may be able to send an override request requesting that her communication capabilities not be downgraded. In some embodiments the message (or one similar thereto) may be sent to other users of the VTG. Furthermore, in particular embodiments one or more of these other users may have the ability to send an override request. In some embodiments, the IS may make the decision as to whether or not to grant the override request. In particular embodiments the IS may send the override request to another user, such as a dispatcher, to allow the dispatcher to decide whether or not the override request should be granted.

Some time after the downgrade alert message has been sent, the IS may then downgrade the user's communication capabilities. For example, at step 570 the IS prevents the first endpoint from transmitting communications. In other embodiments the IS may, for example, decrease the bandwidth or change the communication medium (e.g., prevent the transmission of audible communications but allow text-based communications) that the first user is able to use.

Some of the steps illustrated in FIG. 4 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10 and illustrated endpoints and interoperability systems, these elements may be combined, rearranged or positioned in order to accommodate particular routing architectures or needs. In addition, any of these elements may be provided as separate external components to communication system 10 and illustrated endpoints and interoperability systems, or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for providing congestion management within a virtual talk group, comprising:
   facilitating communication within a virtual talk group between a plurality of endpoints of different communication networks;
   monitoring, at an interoperability system, a communication congestion level within the virtual talk group;
   tracking, at the interoperability system, at least one priority characteristic specific to each of at least two endpoints of the plurality of endpoints within the virtual talk group;
   ranking the at least two endpoints based on the at least one priority characteristic specific to each of the at least two endpoints;
   detecting that the communication congestion level exceeds a congestion threshold; and reducing the congestion level by executing at least one policy based on the ranking of the at least two endpoints.

2. The method of claim 1, wherein detecting that the communication congestion level exceeds the congestion threshold comprises detecting more than a first number of floor control requests within a first amount of time.

3. The method of claim 1, wherein detecting that the communication congestion level exceeds the congestion threshold comprises detecting more than a first percent of the airtime being used for communications within the virtual talk group.

4. The method of claim 1, wherein detecting that the communication congestion level exceeds the congestion threshold comprises detecting that less than a second percent of the airtime is not being used for communications within the virtual talk group.

5. The method of claim 1, wherein detecting that the communication congestion level exceeds the congestion threshold comprises detecting more than a second number of communications being preempted within a second amount of time.

6. The method of claim 1, wherein tracking the at least one priority characteristic for the at least one endpoint of the plurality of endpoints within the virtual talk group comprises tracking a role associated with the least one endpoint of the plurality of endpoints within the virtual talk group.

7. The method of claim 1, wherein tracking the at least one priority characteristic for the at least one endpoint of the plurality of endpoints within the virtual talk group comprises tracking a rank associated with the least one endpoint of the plurality of endpoints within the virtual talk group.

8. The method of claim 1, wherein tracking the at least one priority characteristic for the at least one endpoint of the plurality of endpoints within the virtual talk group comprises tracking at least one feature of the respective communication network associated with the at least one endpoint of the plurality of endpoints within the virtual talk group.

9. The method of claim 1, further comprising:
receiving a virtual talk group purpose message specifying a purpose of the virtual talk group; and
wherein reducing the congestion level by executing at least one policy based on the at least one priority characteristic of the at least one endpoint comprises reducing the congestion level by executing at least one policy based on the purpose of the virtual talk group and the at least one priority characteristic.

10. The method of claim 1, wherein reducing the congestion level comprises reducing the congestion level by preventing a first endpoint of the plurality of endpoints from transmitting a communication to at least one other endpoint of the plurality of endpoints of the virtual talk group.

11. The method of claim 10, further comprising sending a downgrade alert message to the first endpoint alerting the first endpoint that the first endpoint will no longer be able to transmit a communication to the at least one other endpoint of the plurality of endpoints of the virtual talk group.

12. The method of claim 10, further comprising receiving an override request from the first endpoint requesting that the first endpoint remain able to transmit a communication to the at least one other endpoint of the plurality of endpoints of the virtual talk group.

13. The method of claim 12 further comprising:
forwarding the override request to a second endpoint; and
receiving an override response message from the second endpoint.

14. The method of claim 10, further comprising providing an indication to the at least one other endpoint that alerts a user of the at least one other endpoint that the first endpoint of the plurality of endpoints is prevented from transmitting a communication to the at least one other endpoint.

15. The method of claim 1, wherein the at least one priority characteristic for the at least one endpoint of the plurality of endpoints within the virtual talk group comprises an organizational affiliation associated with the at least one endpoint of the plurality of endpoints within the virtual talk group.

16. The method of claim 1, wherein reducing the congestion level comprises downgrading a communication capability of at least a first endpoint irrespective of an amount of communication generated by the first endpoint.

17. The method of claim 1, wherein reducing the congestion level comprises reducing the congestion level by executing at least one policy that downgrades the communication of a subset of the plurality of endpoints based on the at least one priority characteristic, the subset comprising at least two endpoints.

18. A system for providing congestion management within a virtual talk group, comprising:
an interface, at an interoperability system, operable to:
facilitate communication within a virtual talk group between a plurality of endpoints of different communication networks; and
monitor a communication congestion level within the virtual talk group; and
a processor, at the interoperability system, coupled to the interface and operable to:
track at least one priority characteristic specific to each of at least two endpoints of the plurality of endpoints within the virtual talk group;
rank the at least two endpoints based on the at least one priority characteristic specific to each of the at least two endpoints;
detect that the communication congestion level exceeds a congestion threshold; and
reduce the congestion level by executing at least one policy based on the ranking of the at least two endpoints.

19. The system of claim 18, wherein the processor operable to detect that the communication congestion level exceeds the congestion threshold comprises a processor operable to detect more than a first number of floor control requests within a first amount of time.

20. The system of claim 18, wherein the processor operable to detect that the communication congestion level exceeds the congestion threshold comprises a processor operable to detect more than a first percent of the airtime being used for communications within the virtual talk group.

21. The system of claim 18, wherein the processor operable to detect that the communication congestion level exceeds the congestion threshold comprises a processor operable to detect less than a second percent of the airtime is not being used for communications within the virtual talk group.

22. The system of claim 18, wherein the processor operable to detect that the communication congestion level exceeds the congestion threshold comprises a processor operable to detect more than a second number of communications being preempted within a second amount of time.

23. The system of claim 18, wherein the processor operable to track the at least one priority characteristic for the at least one endpoint of the plurality of endpoints within the virtual talk group comprises a processor operable to track a role associated with the least one endpoint of the plurality of endpoints within the virtual talk group.

24. The system of claim 18, wherein the processor operable to track the at least one priority characteristic for the at least one endpoint of the plurality of endpoints within the virtual talk group comprises a processor operable to track a rank associated with the least one endpoint of the plurality of endpoints within the virtual talk group.

25. The system of claim 18, wherein the processor operable to track the at least one priority characteristic for the at least one endpoint of the plurality of endpoints within the virtual talk group comprises a processor operable to track at least one feature of the respective communication network associated with the at least one endpoint of the plurality of endpoints within the virtual talk group.

26. The system of claim 18, wherein:
the interface is further operable to receive a virtual talk group purpose message specifying a purpose of the virtual talk group; and
wherein the processor operable to reduce the congestion level by executing at least one policy based on the at least one priority characteristic of the at least one endpoint comprises a processor operable to reduce the congestion level by executing at least one policy based on the purpose of the virtual talk group and the at least one priority characteristic.

27. The system of claim 18, wherein the processor operable to reduce the congestion level comprises a processor operable to reduce the congestion level by preventing a first endpoint of the plurality of endpoints from transmitting a communication to at least one other endpoint of the plurality of endpoints of the virtual talk group.

28. The system of claim 27, wherein the interface is further operable to send a downgrade alert message to the first endpoint alerting the first endpoint that the first endpoint will no longer be able to transmit a communication to the at least one other endpoint of the plurality of endpoints of the virtual talk group.

29. The system of claim 27, wherein the interface is further operable to receive an override request from the first endpoint requesting that the first endpoint remain able to transmit a communication to the at least one other endpoint of the plurality of endpoints of the virtual talk group.

30. The system of claim 29 wherein the processor is further operable to:
forward the override request to a second endpoint; and
receive an override response message from the second endpoint.

31. A non-transitory computer readable medium comprising code that when executed by a processor is operable to:
facilitate communication within a virtual talk group between a plurality of endpoints of different communication networks;
monitor, at an interoperability system, a communication congestion level within the virtual talk group;
track, at the interoperability system, at least one priority characteristic specific to each of at least two endpoints of the plurality of endpoints within the virtual talk group;
rank the at least two endpoints based on the at least one priority characteristic specific to each of the at least two endpoints;
detect that the communication congestion level exceeds a congestion threshold; and
reduce the congestion level by executing at least one policy based on the ranking of the at least two endpoints.

32. The medium of claim 31, wherein the code operable to detect that the communication congestion level exceeds the congestion threshold comprises code operable to detect more than a first number of floor control requests within a first amount of time.

33. The medium of claim 31, wherein the code operable to detect that the communication congestion level exceeds the congestion threshold comprises code operable to detect more than a first percent of the airtime being used for communications within the virtual talk group.

34. The medium of claim 31, wherein the code operable to detect that the communication congestion level exceeds the congestion threshold comprises code operable to detect less than a second percent of the airtime is not being used for communications within the virtual talk group.

35. The medium of claim 31, wherein the code operable to detect that the communication congestion level exceeds the congestion threshold comprises code operable to detect more than a second number of communications being preempted within a second amount of time.

36. The medium of claim 31, wherein the code operable to track the at least one priority characteristic for the at least one endpoint of the plurality of endpoints within the virtual talk group comprises code operable to track a role associated with the least one endpoint of the plurality of endpoints within the virtual talk group.

37. The medium of claim 31, wherein the code operable to track the at least one priority characteristic for the at least one endpoint of the plurality of endpoints within the virtual talk group comprises code operable to track a rank associated with the least one endpoint of the plurality of endpoints within the virtual talk group.

38. The medium of claim 31, wherein the code operable to track the at least one priority characteristic for the at least one endpoint of the plurality of endpoints within the virtual talk group comprises code operable to track at least one feature of the respective communication network associated with the at least one endpoint of the plurality of endpoints within the virtual talk group.

39. The medium of claim 31, wherein:
the code is further operable to receive a virtual talk group purpose message specifying a purpose of the virtual talk group; and
wherein the code operable to reduce the congestion level by executing at least one policy based on the at least one priority characteristic of the at least one endpoint comprises code operable to reduce the congestion level by executing at least one policy based on the purpose of the virtual talk group and the at least one priority characteristic.

40. The medium of claim 31, wherein the code operable to reduce the congestion level comprises code operable to reduce the congestion level by preventing a first endpoint of the plurality of endpoints from transmitting a communication to at least one other endpoint of the plurality of endpoints of the virtual talk group.

41. The medium of claim 40, wherein the code is further operable to send a downgrade alert message to the first endpoint alerting the first endpoint that the first endpoint will no longer be able to transmit a communication to the at least one other endpoint of the plurality of endpoints of the virtual talk group.

42. The medium of claim 40, wherein the code is further operable to receive an override request from the first endpoint requesting that the first endpoint remain able to transmit a communication to the at least one other endpoint of the plurality of endpoints of the virtual talk group.

43. The medium of claim 42 wherein the code is further operable to:
forward the override request to a second endpoint; and
receive an override response message from the second endpoint.

44. A system for providing congestion management within a virtual talk group, comprising:
- means for facilitating communication within a virtual talk group between a plurality of endpoints of different communication networks;
- means for monitoring, at an interoperability system, a communication congestion level within the virtual talk group;
- means for tracking, at the interoperability system, at least one priority characteristic specific to each of at least two endpoints of the plurality of endpoints within the virtual talk group;
- means for ranking the at least two endpoints based on the at least one priority characteristic specific to each of the at least two endpoints;
- means for detecting that the communication congestion level exceeds a congestion threshold; and
- means for reducing the congestion level by executing at least one policy based on the ranking of the at least two endpoints.

* * * * *